March 29, 1966 W. G. STOECKICHT 3,242,817
STRAIGHT OR HELICAL GUIDE FOR USE IN SHAPING GEARS
BY MEANS OF CIRCULAR CUTTERS
Filed Dec. 26, 1963 3 Sheets-Sheet 1
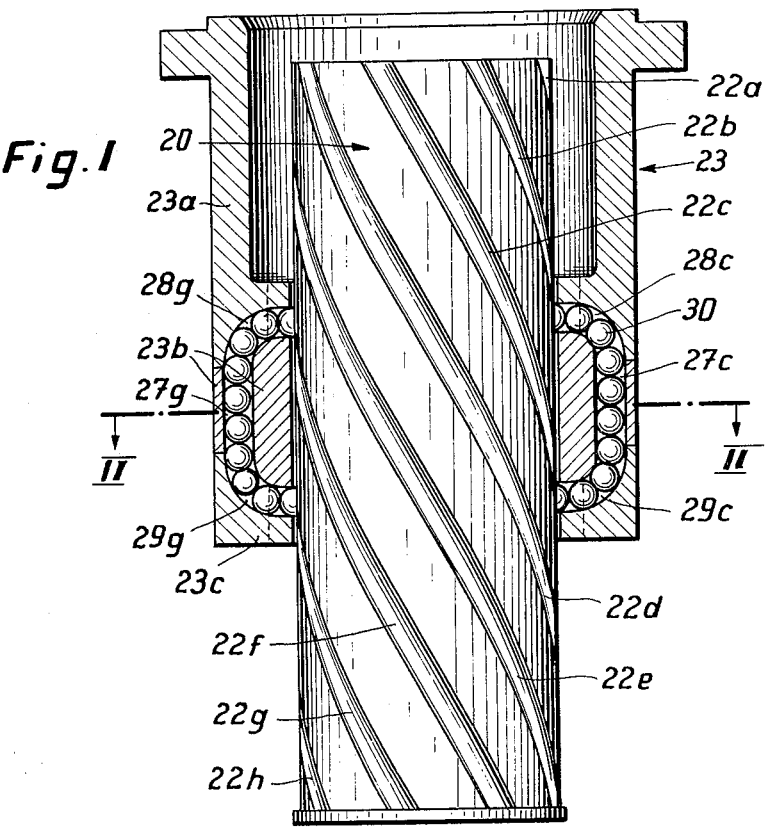
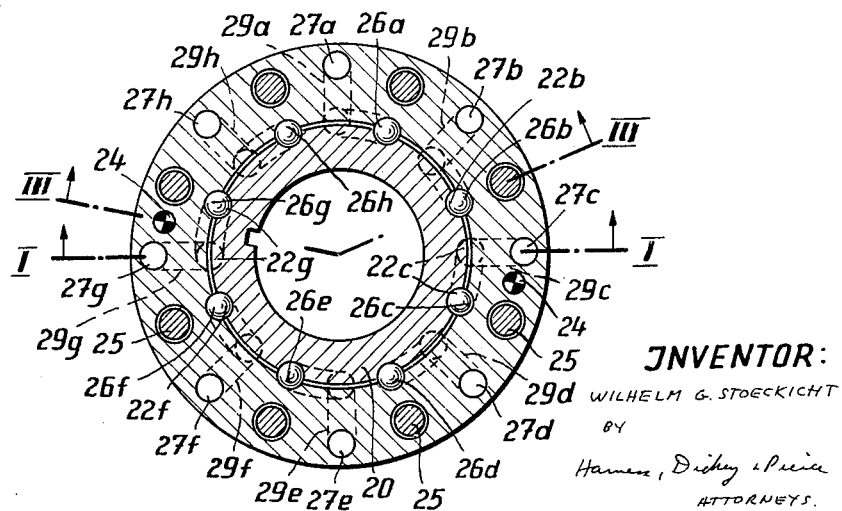
INVENTOR:
WILHELM G. STOECKICHT
BY
Harness, Dickey & Pierce
ATTORNEYS.

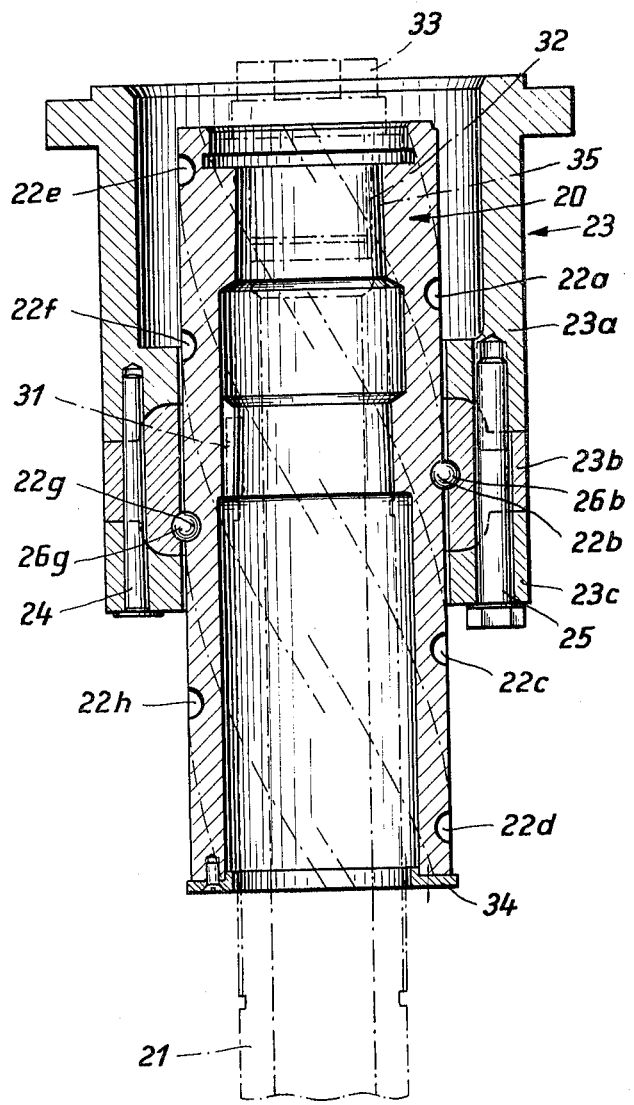

March 29, 1966  W. G. STOECKICHT  3,242,817
STRAIGHT OR HELICAL GUIDE FOR USE IN SHAPING GEARS
BY MEANS OF CIRCULAR CUTTERS
Filed Dec. 26, 1963  3 Sheets-Sheet 3

INVENTOR:
WILHELM G. STOECKICHT
BY
Harness, Dickey & Pierce
ATTORNEYS.

United States Patent Office 3,242,817
Patented Mar. 29, 1966

3,242,817
STRAIGHT OR HELICAL GUIDE FOR USE IN SHAPING GEARS BY MEANS OF CIRCULAR CUTTERS
Wilhelm G. Stoeckicht, 4 Rugendasstrasse, Munich-Solln, Germany
Filed Dec. 26, 1963, Ser. No. 333,284
Claims priority, application Germany, Jan. 23, 1963, St 20,205
2 Claims. (Cl. 90—7)

The invention relates to a device to shape the toothing of gears by means of a circular cutter being axially reciprocated and provided with a helical guide determining the respective rotary position of the circular cutter in correspondence with the angle of inclination of the toothing to be cut.

With known gear shapers which are operating with circular cutters, the tool is guided either paraxially in the case of straight toothings being produced, or has superimposed thereon in addition to its longitudinal movement a rotary movement in the case of helical toothings being produced.

These sliding guides, however, reliable and safe they may be in operation, are having two disadvantages:

First, the sliding guide of the spindle inevitably has a clearance which results into inaccuracies in the guidance and thus into tooth alignment errors. These errors are becoming increasingly disturbing with increasing requirements regarding the accuracy of the toothings.

Secondly, these sliding guides have inherent limitations concerning the size of the angles of inclination that may be generated. The greater this angle of inclination, the greater be the pressures effective on the slide rings which are occurring in the conversion of the axial movement into a helical movement thus setting practically a limit to the generation of larger angles of inclination.

It is the object of the invention to avoid these drawbacks. This is obtained in that in accordance with the invention so-called recirculating ball nuts and screws are employed instead of the sliding guides for the tool spindles. Such ball screws (as they are called in abbreviation) are e.g. known per se from an application in form of the so-called worm and sector steering for automotive vehicles; at this application a rotary movement is to be transformed into a to and fro movement.

It is new to employ such ball screws for the tool spindles or gear shapers and to transform in this application a straight-line or axial movement into a rotary movement which is superimposed on the axial movement or associated thereto. Such a device brings about two important advantages specific to the operation of gear shapers in comparison with the previously usual sliding guides.

First, such a guide may be formed with absolutely no clearance (backlash) thus avoiding all the sources of errors resulting from the inevitable play of the sliding guide.

Secondly, the fact that in the ball screw guide practically only rolling operations occur brings about quite an extra-ordinary reduction of the frictional forces occurring during the operation.

This means that the axial movement effective on the spindle is capable of transferring rotary movements substantially in excess of those transferred with the sliding guide. In other words, the spindle guide may be designed for leads which are substantially smaller; this permits the production of toothings also with very great angles of inclination.

The drawings show one embodiment of the invention, namely:

FIGURE 1 is a longitudinal sectional view of an embodiment of the invention, taken along the line I—I of FIGURE 2;

FIGURE 2 is a cross-sectional view taken along the line II—II of FIGURE 1;

FIGURE 3 is a longitudinal sectional view taken along the line III—III of FIGURE 2.

Figure 4:
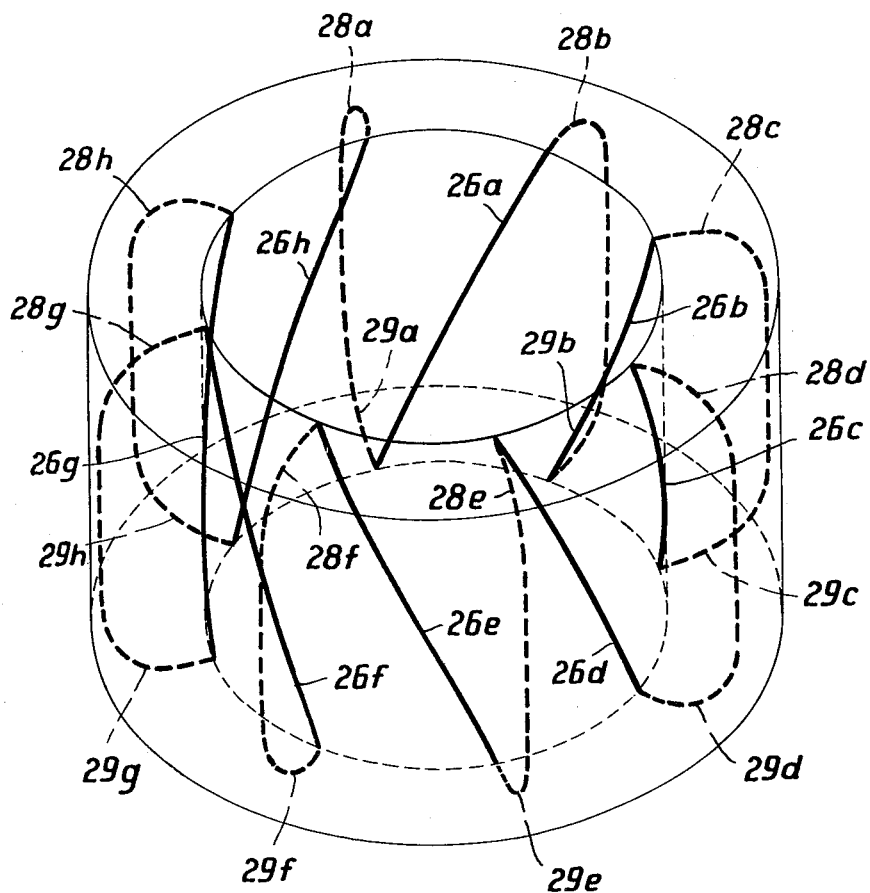
FIGURE 4 is a schematic view showing the course of the endless ball path in the embodiment of FIGURES 1 to 3.

An example of embodiment in which the rolling path for the balls of the recirculating ball nuts and screws assembly consists of several courses of a thread, is shown in FIGS. 1–4.

Referring now to FIGS. 1–4, 20 designates the inner member of the recirculating ball nuts and screws assembly which is connected as a sleeve-like member with the tool spindle 21 indicated in dotted lines in FIG. 3. The cylindrical outer peripheral surface of said sleeve-like inner member 20 has arranged thereon altogether eight grooves 22a, b, c, d, e, f, g, h, which are extending in the shape of a helical line. The inner member 20 is surrounded by an outer member 23 which is fastened to a fixed housing portion in a manner not shown in detail.

Looking in the direction of the spindle axis, the outer member 23 consists of a basic member 23a, an intermediate piece 23b and a closure member 23c. These parts are on the one hand interconnected by two conical pins 24 and on the other hand by eight axially aligned screws 25, as is shown in FIGS. 2 and 3. The parts 23a, 23b, 23c are provided with an inner bore which corresponds to the cylindrical outer periphery of the inner member 20 providing the necessary radial clearance. On the inner surface of the intermediate member 23b, eight helically extending grooves 26a, b, c, d, e, f, g, h are machined-in peripherally spaced from one another and having the same pitch as have the grooves 22a–h. Furthermore, the intermediate member 23b has machined therein in a manner that may be seen from FIGS. 1 and 2, axially extending passages 27a, b, c, d, e, f, g, h which are radially spaced from the inner surface. The ends of these passages are joined in each direction of the axis by radially inwardly extending passage members 28a–h and 29a–h, which, as will be seen from FIG. 1, are formed by outwardly rounded radial grooves peripherally spaced along the facing sides of the base member 23a and the closure member 23c, said grooves being closed towards the inside by rounded face portions of the intermediate member 23b. In this manner, eight U-shaped passages are formed by the straight channel portions 27a–h and the curved channel portions 28a–h and 29a–h joining on both sides. These channels have their one and other end terminating in two different grooves disposed adjacent one another out of the number of grooves 26a–h arranged on the inner surface of the intermediate member 23b. The grooves 22a–h of the inner member 20 connected with the tool spindle are disposed opposite the grooves 26a–h of the outer member 23 so that together with the U-shaped channels a passage channel for the balls 30 is provided. This passage channel is extending continuously over the whole periphery. The balls may travel from a U-shaped channel arranged in the outer member 23 via the helically extending channel piece next in line looking in the direction of movement of the balls and formed by two of the grooves 26a–h and 22a–h to the next U-shaped channel arranged in the outer member 23 and thence to the next one and so on, so that a ball is travelling through all the channels over the whole periphery if the relative movement between the inner member 20 and the outer member 23 causes travelling paths for the balls of sufficient length therefor, which however rarely happens.

FIG. 4 shows schematically the interconnection of the different helical paths (26a–h), which are shown in full lines on FIG. 4 with the different outer channels (28a–h), which are shown in dotted lines.

As shown in FIG. 3 in dotted lines, the inner member 20 is connected with the tool spindle 21 via a key 31 and cone 35. The tool spindle and the inner space of the inner member 20 are designed slightly conically so that they are jamming one another when telescoped. The tool spindle penetrates the inner member 20 nearly as far as the end and has an inner thread 32 provided at its end with an abutment nut 33 screwed therein abutting an end face shoulder of the inner member 20 and pulling the tool spindle into the inner member 20 when tightened. The other end face of the inner member 20 has arranged thereon an annular covering plate 34.

The arrangement shown in FIGS. 1 to 4 represent one of the many possible examples in which the return path of the balls leads over several helical paths. Which arrangement should be chosen in every single instance will depend on the number of helical paths, their length of action and the helical lead.

The invention makes it possible to design the straight-line or helical guide of the tool spindle of gear shapers in such a manner that on the one hand a guidance free from backlash and thus an exact guidance is guaranteed and, on the other hand, because of the low frictional forces occurring in the guiding operation, inclinations of teeth may be generated which it has been impossible to generate before with known gear shapers.

The invention is especially suited to cut the toothings of straight-fluted or helically toothed spur gears.

What I claim is:

1. In a tool supporting device for use in gear tooth shaping machines having a circular cutter, a body having a central bore, a shaft movably mounted within said bore, said cutter being adapted to be secured to said shaft, a plurality of equally angularly spaced first grooves of semicircular cross section extending along said bore, said grooves all having first ends in a first common radial plane and second ends in a second common radial plane spaced axially from said first plane, a plurality of equally angularly spaced second grooves of semicircular cross section on the surface of said shaft, said second grooves being equal in number to and having the same inclination with respect to the shaft axis as in said first grooves but being substantially longer in an axial direction than said first grooves, the first and second grooves when in registry thus forming a plurality of first guiding channels of circular cross section, a plurality of second guiding channels spaced radially outwardly from said body bore, each of said second guiding channels being U-shaped and having axially spaced ends extending inwardly toward said bore and connecting the first end of one of said first grooves with the second end of another groove whereby all of said first and second guiding channels together form a single endless path, a plurality of balls arranged one behind the other in each of said second channels, and driving means for reciprocating said shaft along said bore.

2. The combination according to claim 1, said first and second grooves and therefore said first guiding channels being helical, whereby a rotary motion will be imparted to said shaft when it is reciprocated, to provide a path for said cutter in correspondence with the angle of inclination of the gear teeth to be shaped.

References Cited by the Examiner

UNITED STATES PATENTS

| | | | |
|---|---|---|---|
| 676,227 | 6/1901 | Fellows | 90—7 |
| 1,103,851 | 7/1914 | Sykes | 90—7 |
| 2,945,366 | 7/1960 | Sears | 308—6 X |
| 3,046,808 | 7/1962 | De Mart | 308—185 X |

FOREIGN PATENTS

| | | |
|---|---|---|
| 1,298,203 | 5/1962 | France. |

OTHER REFERENCES

High Speed Horizontal Rifle Broaching Machine: Technical Report WVT–R1–6108–1. Watervliet Arsenal, November 1961, 32 pages, pages 10, 12 and 13.

WILLIAM W. DYER, JR., *Primary Examiner.*

L. VLACHOS, *Assistant Examiner.*